(12) United States Patent
Mansfield

(10) Patent No.: US 8,633,930 B2
(45) Date of Patent: Jan. 21, 2014

(54) NON-LINEAR TEXT FLOW

(75) Inventor: Philip Andrew Mansfield, Vancouver (CA)

(73) Assignee: Apple Inc., Cupertino, CA (US)

( * ) Notice: Subject to any disclaimer, the term of this patent is extended or adjusted under 35 U.S.C. 154(b) by 1173 days.

(21) Appl. No.: 11/728,814

(22) Filed: Mar. 26, 2007

(65) Prior Publication Data
US 2008/0238927 A1    Oct. 2, 2008

(51) Int. Cl.
*G06T 11/00*    (2006.01)

(52) U.S. Cl.
USPC ........ 345/467; 345/472.3; 345/471; 345/442; 345/629

(58) Field of Classification Search
USPC .............................. 345/467–472.3, 619–689; 382/229–231, 181–189
See application file for complete search history.

(56) References Cited

U.S. PATENT DOCUMENTS

| | | | | |
|---|---|---|---|---|
| 4,550,438 A | * | 10/1985 | Convis et al. | 382/242 |
| 4,742,786 A | * | 5/1988 | Hashimoto et al. | 112/102.5 |
| 5,539,868 A | * | 7/1996 | Hosoya et al. | 345/471 |
| 5,548,700 A | * | 8/1996 | Bagley et al. | 715/255 |
| 5,689,620 A | * | 11/1997 | Kopec et al. | 706/12 |
| 5,724,072 A | * | 3/1998 | Freeman et al. | 345/648 |
| 5,734,761 A | * | 3/1998 | Bagley | 382/309 |
| 5,803,629 A | * | 9/1998 | Neville et al. | 400/304 |
| 5,805,783 A | | 9/1998 | Ellson et al. | |
| 5,809,166 A | * | 9/1998 | Huang et al. | 382/178 |
| 6,236,390 B1 | * | 5/2001 | Hitchcock | 345/694 |
| 6,512,522 B1 | * | 1/2003 | Miller et al. | 345/474 |
| 6,624,814 B1 | * | 9/2003 | Karow et al. | 345/467 |
| 6,643,401 B1 | * | 11/2003 | Kashioka et al. | 382/197 |
| 6,687,404 B1 | * | 2/2004 | Hull et al. | 382/226 |
| 6,754,391 B2 | * | 6/2004 | Carau, Sr. | 382/229 |
| 6,803,913 B1 | * | 10/2004 | Fushiki et al. | 345/467 |
| 6,829,748 B1 | * | 12/2004 | Browne et al. | 715/258 |
| 6,911,980 B1 | * | 6/2005 | Newell et al. | 345/441 |
| 7,028,260 B1 | * | 4/2006 | Morsello | 715/210 |
| 7,167,274 B2 | * | 1/2007 | McCully | 358/1.9 |
| 7,320,104 B2 | * | 1/2008 | Lynn et al. | 715/256 |
| 7,412,360 B2 | * | 8/2008 | Surazhsky et al. | 703/2 |
| 7,453,464 B1 | * | 11/2008 | Acquavella | 345/474 |
| 7,492,366 B2 | * | 2/2009 | Burago et al. | 345/469.1 |
| 7,623,130 B1 | * | 11/2009 | Burkey | 345/467 |
| 7,752,543 B2 | * | 7/2010 | Gerhard et al. | 715/256 |

(Continued)

FOREIGN PATENT DOCUMENTS

WO    WO 00/63848 A    10/2000

OTHER PUBLICATIONS

Andersson et al. Scalable Vector Graphics (SVG) 1.1 Specification, 10.13.2 The 'textPath' element. Jan. 14, 2003: http://www.w3.org/TR/SVG11/text.html#TextPathElement.

Aycan Gulez, How to Create 3D Text in Illustrator, May 25, 2001.

(Continued)

*Primary Examiner* — James A Thompson
*Assistant Examiner* — Abderrahim Merouan
(74) *Attorney, Agent, or Firm* — Kilpatrick Townsend & Stockton LLP

(57) ABSTRACT

Rendering glyphs is disclosed. A set of glyphs to be flowed along a nonlinear path are received. A first glyph included in the set is placed at a corresponding location along the nonlinear path such that the first glyph is spaced from a second glyph, at a point nearest the second glyph, by at least a prescribed distance.

21 Claims, 21 Drawing Sheets

(56) References Cited

U.S. PATENT DOCUMENTS

| | | | |
|---|---|---|---|
| 8,121,338 B2* | 2/2012 | Clermont et al. | 382/100 |
| 2003/0200236 A1* | 10/2003 | Hong | 708/200 |
| 2006/0235825 A1 | 10/2006 | Wong et al. | |
| 2010/0262905 A1* | 10/2010 | Li | 715/702 |

OTHER PUBLICATIONS

Author Unknown, From www.studio.adobe.com, Put Type on a Path, Excerpted from "Real World Adobe Illustrator CS2" Mordy Golding, 2005.

Author Unknown, Adobe Illustrator Tutorials from Fay Studios, May 11, 2006.

"InDesign: Creating type on a path", Adobe, 5 pages. Available at: http://help.adobe.com/en_US/indesign/cs/using/WSa285fff53dea4f8617383751001ea8cb3f-6c4ea.html.

Anton, Kelly Kordes et al., "Working with Text in Adobe InDesign CS2", Adobe Press, Jun. 30, 2006, 24 pages. Available at: http://www.adobepress.com/articles/article.asp?p=483800&segNum=4.

International Preliminary Report on Patentability for International PCT Application No. PCT/US2008/0030073, mailed Sep. 26, 2009, 6 pages.

International Search Report for International PCT Application No. PCT/US2008/0030073, mailed Jul. 22, 2008, 3 pages.

International Written Opinion for International PCT Application No. PCT/US2008/0030073, mailed Sep. 26, 2009, 5 pages.

* cited by examiner

102 ↘ buggy
104 advance of 'W' when followed by 'A' advance values in a word with expanded character spacing fi fl

*Zapfino*

FIG. 1K

1102 → WHAT

NON-LINEAR TEXT FLOW

BACKGROUND OF THE INVENTION

An author, graphic designer, or other content creator may desire at times, e.g., for artistic and/or other visual effect, to have text follow a path other than a traditional linear path running (in English) from left to right along a line parallel to the bottom of the page. Software applications have provided limited ability to include text along a nonlinear path, but to date such capabilities have been limited to a constrained set of predetermined paths or path types and have not supported such common word processing functionality as arbitrary user specified styling, wrapping, etc. In addition, in some cases text has been laid out along a path in a manner resulting in undesirable effects, such as one or more adjacent glyphs interfering with (e.g., overlapping or being placed too near) each other. Therefore, there is a need for a more flexible and effective way to render text along a nonlinear path.

BRIEF DESCRIPTION OF THE DRAWINGS

Various embodiments of the invention are disclosed in the following detailed description and the accompanying drawings.

FIGS. 1F, 1G, 1H, 1I, 1J, and 1K show examples of ligatures.

DETAILED DESCRIPTION

Figures 1A, 1B:
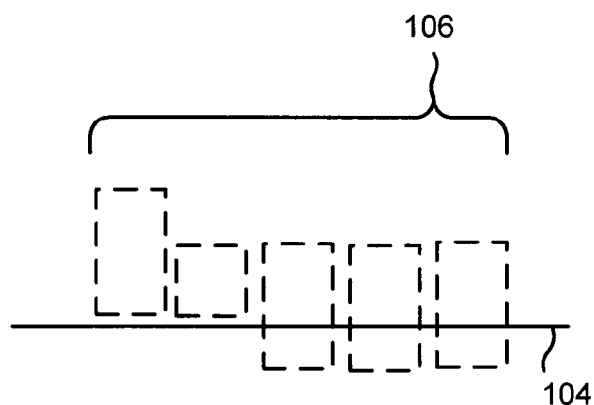
FIG. 1A illustrates an example of text flow along a linear path.
FIG. 1B shows a set of glyph boxes, each of which is associated with a corresponding letter of the word "buggy" as shown in FIG. 1A.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering text along a nonlinear path is disclosed. A nonlinear path is received. In various embodiments, the path may be any arbitrary path described in any number of ways, such as by specifying a locus of points, selecting a predefined path, providing an image, providing or selecting a shape, and describing as a polynomial or other equation, a path along which text is desired to flow. Text desired to flow along the path is received. The glyphs comprising the text are placed one by one along the path in a manner that in a manner that avoids interference between adjacent glyphs (e.g., no overlap) and unpleasing visual effects (excessive gaps, uneven spacing, etc.). In some embodiments, curve smoothing is applied to smooth a nonlinear path so as to facilitate placing text along the path. In some embodiments, at least some paths are approximated as a series of chords for purposes of placing text along a nonlinear path. In some embodiments, existing kerning information is used for text placement along at least some nonlinear paths. In some embodiments, additional information is defined for text characters (or other glyphs) to make it possible to take advantage of kerning opportunities not applicable to placing text along a linear path, e.g., by defining for at least some glyphs a non-rectangular quadrilateral or other polygon that conforms more nearly to the outline of the glyph, e.g., a first glyph, thereby permitting an adjacent (second) glyph having a complementary outline—at least when place adjacent to the first glyph along the particular nonlinear path along which text is desired to flow—to be placed nearer the first glyph than would otherwise be done using a rectangular glyph box for each glyph. Shapes can be described as a sequence of paths that are filled in their interior and/or stroked along their perimeter, where each path is described by specifying planar coordinates (x, y) as a function of a parameter t that varies continuously along the path and uniquely identifies points along the path, or by specifying a functional relationship between the x and y coordinates. As examples, x and y could each be polynomial functions of t, or x and y could be related by the condition that a multinomial in x and y is equal to zero. Bezier curves are a special case of the former, and conic sections (ellipses, hyperbolae, parabolas, straight lines) are special cases of the latter. Shapes can be filled and/or stroked with color, patterns, gradients, images, etc.

Figure 1C:
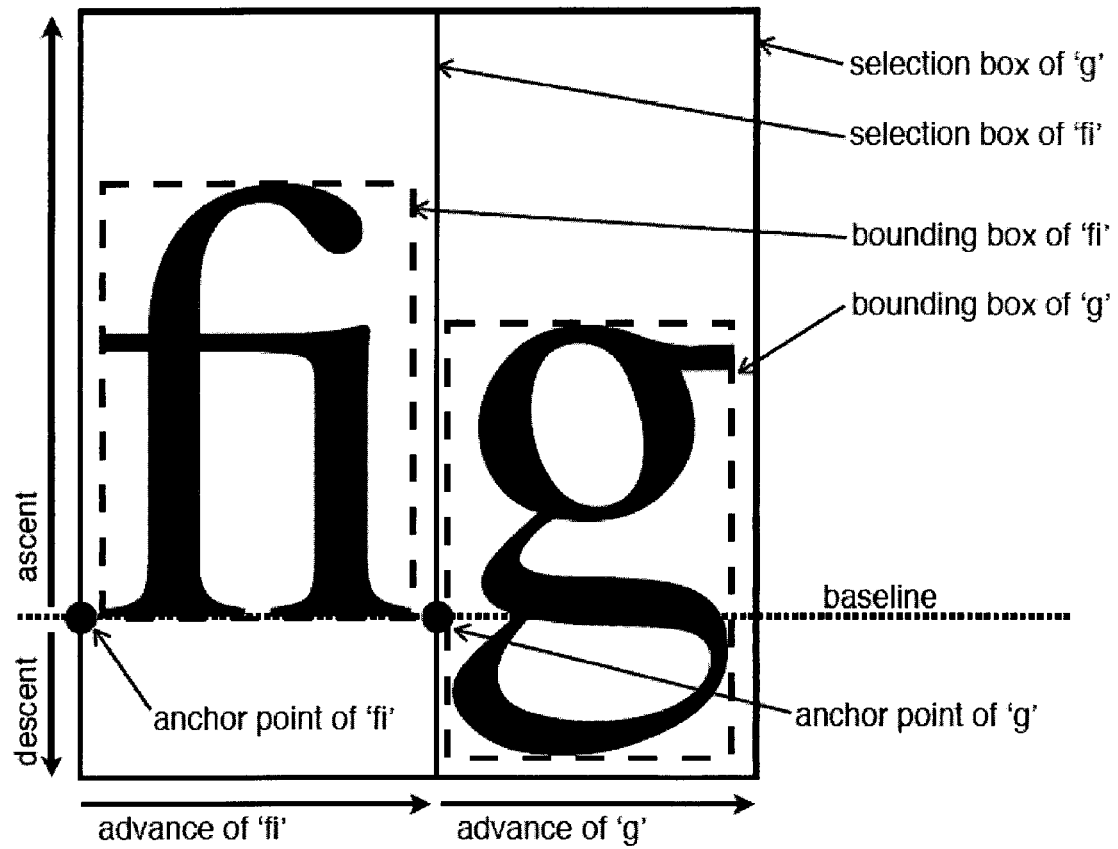
FIG. 1C illustrates a selection box.
Figure 1D:
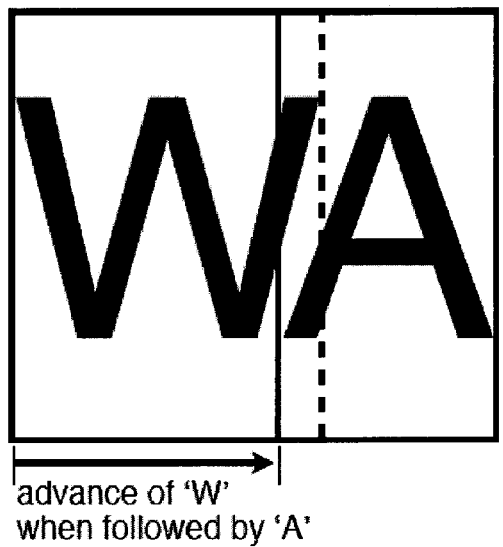
FIG. 1D shows an example of kerning.
Figure 1E:
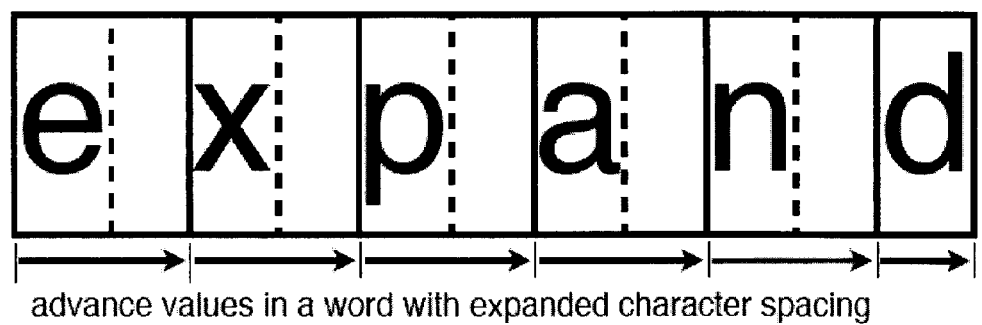
FIG. 1E shows an example of expanded glyph spacing.
Figures 1F, 1G, 1H:
Figures 1I, 1J, 1K:
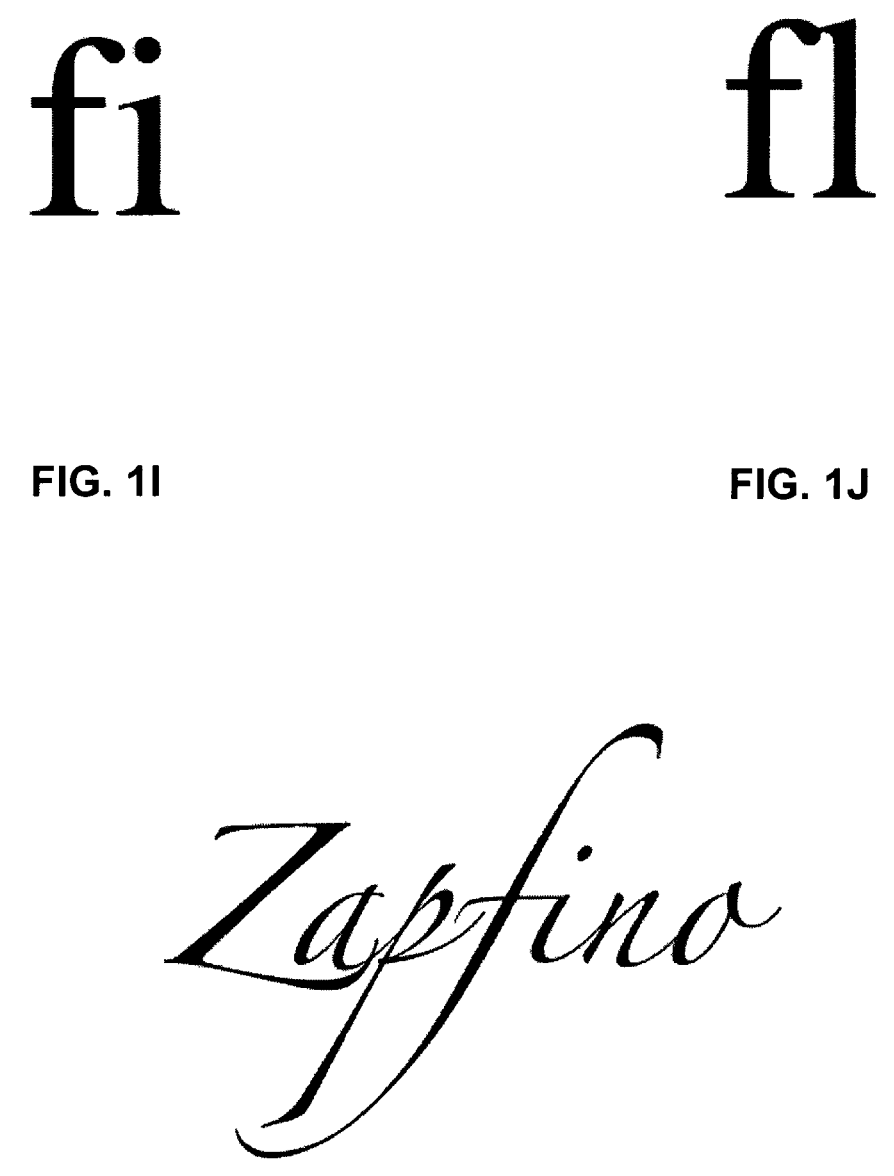

FIG. 1A illustrates an example of text flow along a linear path. In the example shown, the text 102 comprises the word "buggy" arranged along a linear path 104. FIG. 1B shows a set of glyph boxes 106, each of which is associated with a corresponding letter of the word "buggy" as shown in FIG. 1A. In the example shown, glyph placement is achieved by positioning each glyph box along the path 104 in a vertical position such that a glyph baseline of the glyph box is aligned with and positioned on path 104. Glyph spacing in this example is determined by positioning each glyph box along path 104 at a default glyph spacing from a preceding glyph box. In some approaches, the glyph boxes themselves include additional space on either side of the glyph, and default spacing is achieved by position the glyph boxes immediately adjacent to one another, with no additional space in between. As used herein, the term "glyph box" refers to a box used for text layout associated with a glyph. In some embodiments the glyph box is the "selection box" as defined and depicted in FIG. 1C. In some embodiments the glyph box is the "bounding box" by which we mean the smallest-area rectangle with horizontal and vertical sides that completely contains the glyph (though bounding boxes are not normally used for text layout; selection boxes are). The bounding box could be the "geometric bounding box" which completely contains the sequence of paths that constitute the shape, or the "render bounding box" which completely contains the paths plus the full thickness of any stroke applied to the paths. Referring further to FIG. 1C, the "selection box" extends from the anchor point on the left to the advance on the right, and from the descent below to the ascent above. In some embodiments it may also include leading above and/or below. The "anchor point" of a glyph is the point that is normally placed on a text baseline when laying out text. Its horizontal position along this baseline is the left-align position of a new line in a paragraph that has left or justified alignment, or at the advance of the previous glyph if there is one. The "advance" of a glyph is the distance along the baseline from its anchor to the position designated for placement of the anchor point of a next glyph. The "ascent" is the distance from the baseline to the highest of a set of glyphs in the same font, or at least the amount of space reserved above the baseline for drawing glyphs of that font (it is possible for individual glyphs to extend beyond the ascent, which leads to intentional overlap when laying out lines of a paragraph). Similarly the "descent" is the distance below the baseline to the lowest of a set of glyphs in the same font, or at least the amount of space reserved below the baseline for drawing glyphs of that font. "Leading" is an additional amount added above and/or below the baseline to separate successive lines of text when single-spaced. Normally, each glyph has its own anchor point and default advance value, whereas ascent and descent are the same throughout a font. As illustrated in FIG. 1D, the advance value can be changed from its default by kerning (in which case the advance value of a glyph will depend on which glyph follows it) or by explicit adjustments to text style such as expanded glyph spacing, as illustrated in FIG. 1E. In both these cases, the advance value used for purposes of defining the selection box is the actual advance value, not the default value. Using for text layout a glyph box determined by using the selection box for the left and right sides and the bounding box for the top and bottom sides (suitably extending or shortening the sides so that they intersect at the corners) is disclosed. In other words, in some embodiments the glyph box left and right sides are defined to be at the same x position as the selection box left and right sides and the glyph box top and bottom sides are defined to be at the same y position as the bounding box top and bottom sides. In some embodiments, using a glyph box that has left and right sides at the same x position as the selection box and top and bottom sides at the same y position as the bounding box yields better results than using either the selection box or the bounding box because the left and right sides of the selection box (in other words, the x-coordinates of anchor and anchor+advance) are built into the font by the designer to express information about the desired horizontal glyph layout and spacing, but the top and bottom sides of the selection box express the desired vertical line heights, which are not really relevant to horizontal glyph layout and spacing. In some embodiments, the font designer's horizontal layout distances are adjusted in order to avoid collision, e.g., when text or other glyphs are laid out on a path other than a linear path, so in some embodiments the top and bottom sides are chosen to be the highest and lowest y-values of points on the glyph, which is the top and bottom of the bounding box. In cases of small minimum radius of curvature, this will allow the glyphs to be moved closer together (and still not collide) than if the selection box top and bottom were used. In various embodiments, a distinction is made between the terms "glyph", "character", "letter". Glyphs are shapes that represent one or more characters, and letters are examples of characters. Other examples of characters include numbers, punctuation and symbols. Ligatures are glyphs that represent more than one character. Ligatures are used, for example, to draw certain characters differently when they appear in certain sequences. FIGS. 1F, 1G, and 1H show examples of ligatures. Each of FIGS. 1F, 1G, and 1H comprise a single glyph, not including white space. The glyph shown in FIG. 1F represents two characters; the glyph shown in FIG. 1G represents two characters; and the glyph shown in FIG. 1H represents seven characters. For comparison, the same characters as shown in FIGS. 1F, 1G, and 1H are shown in FIGS. 1I, 1J, and 1K, respectively, in the same fonts without ligatures as two, two, and seven separate glyphs, respectively.

Figure 2A:
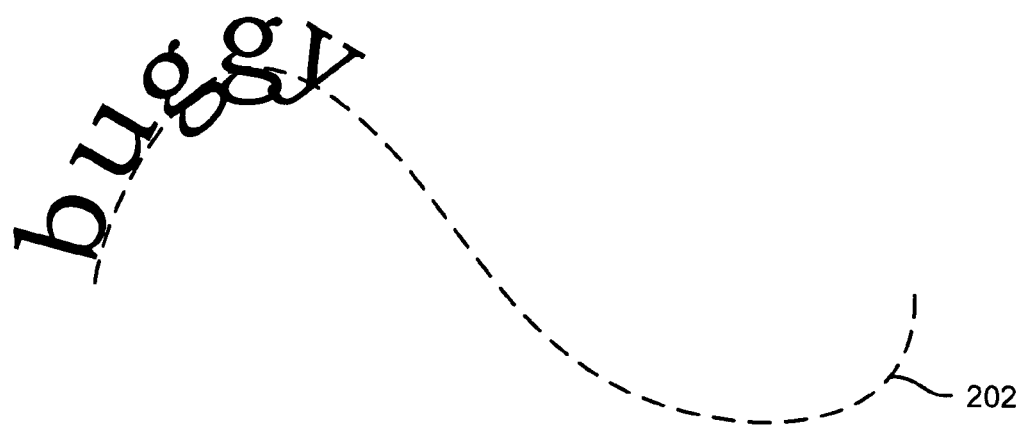
FIGS. 2A and 2B illustrate an example of inter-character interference.
Figure 2B:
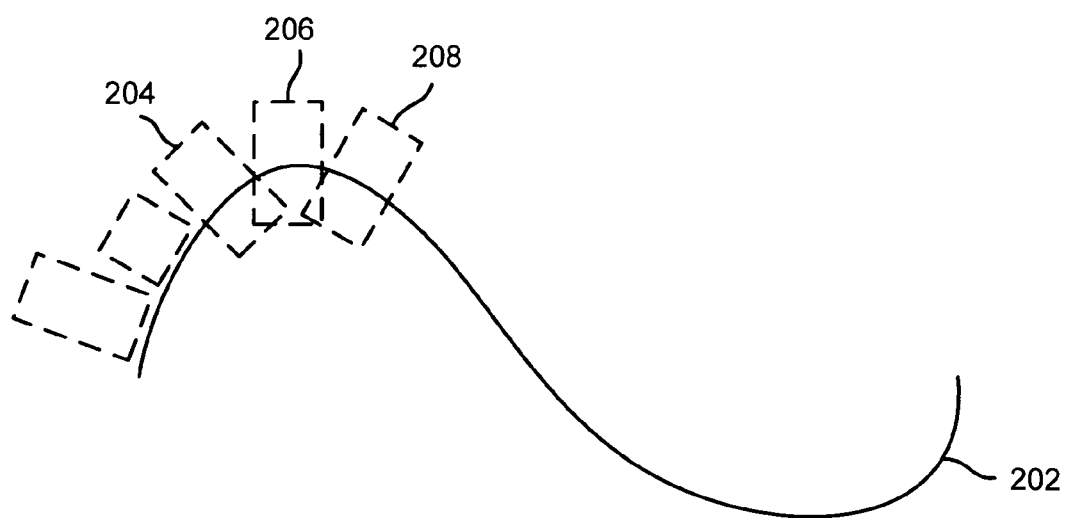

FIGS. 2A and 2B illustrate an example of inter-character interference such as can occur when prior art techniques for allowing text to flow along a non-linear path are employed. In FIG. 2A, the word "buggy" has been flowed along an arbitrary non-linear path 202. In this example, the below-the-baseline portions of the last three characters, "g", "g", and "y", have run together. Such inter-character interference is visually unappealing and in an extreme case could render the text difficult or even impossible to read. FIG. 2B shows the glyph boxes of the characters of the word "buggy" arranged along path 202 with spacing and orientation corresponding to the text as shown in FIG. 2A. In this example, each glyph box is arranged along the path at the default character spacing used for linear text flow and with the character baseline tangent to the path 202. This approach in this example has resulted in the glyph boxes 204, 206, and 208, corresponding to the final characters "g", "g", and "y", respectively, of the word "buggy", to overlap in the region below path 202. This example illustrates that using the character spacing and glyph box information created and optimized for linear flow to provide text flow along a non-linear path can result in inter-character interference, depending on the shape of the path and the attributes of the particular characters or other glyphs.

Providing text flow along an arbitrary non-linear path and with arbitrary styling is disclosed. In some embodiments, each character (glyph) is positioned along the non-linear path in a manner that ensures no character interferes with another character, regardless of the font, size, styling, or other attributes applied to the text. In some embodiments, the description of each glyph comprising a font is used to position the glyph in a manner that ensures the glyph is spaced by a prescribed and/or minimum amount from all other glyphs. For example, in the case of a vector graphic font, the vector graphic description of the outline of the glyph is used to ensure that the glyph does not intersect the corresponding outline of any other character. While precise, using the vector graphic description of each glyph to avoid overlap and/or ensure minimum and/or prescribed spacing may in some environments be too computationally expensive. Therefore, in some embodiments, selection box, anchor point, advance, kerning and other information that already exists for most fonts for purposes of linear text flow are used to providing text flow along a non-linear path. In some embodiments, each successive glyph is positioned along the nonlinear path such that the glyph box does not overlap and/or has a minimum and/or prescribed spacing from the nearest adjacent glyph box.

Figure 3A:
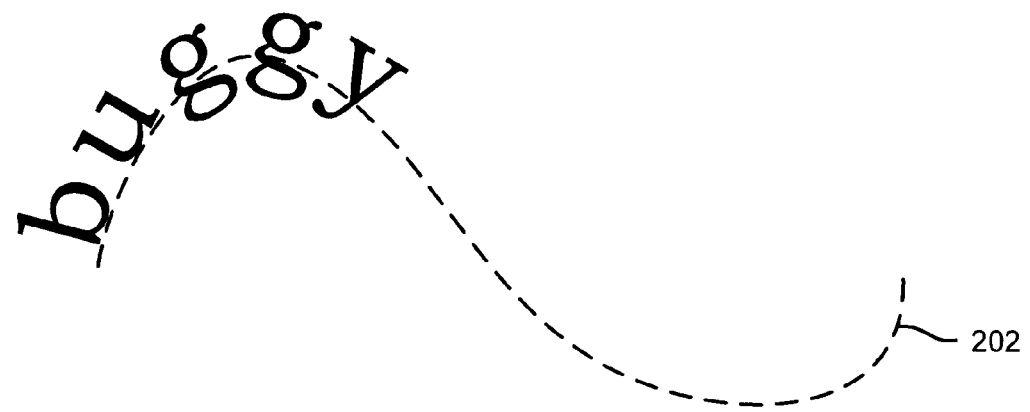
FIGS. 3A and 3B illustrating positioning text along a non-linear path using selection box, bounding box, anchor point, advance, and/or other information developed primarily for linear text flow.
Figure 3B:
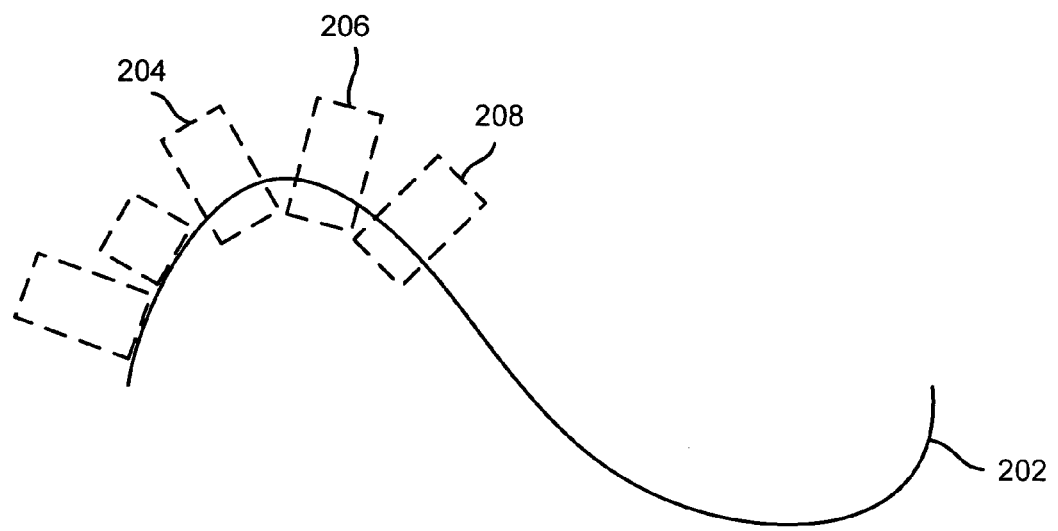

FIGS. 3A and 3B illustrating positioning text along a non-linear path using selection box, bounding box, anchor point, advance, and/or other information developed primarily for linear text flow. FIG. 3A shows the word "buggy" arranged to flow along path 202 in a manner that avoids the inter-character interference shown in FIG. 2A. FIG. 3B shows the corresponding glyph boxes arranged along path 202 to achieve the effect shown in FIG. 3A. In this example, the glyph boxes have been positioned along the path such that no glyph box overlaps with any other glyph box. As can be seen, in the example shown in FIGS. 3A and 3B the above approach has resulted in the glyph boxes 204, 206, and 208 (and their corresponding characters) being spaced somewhat further apart than in the example shown in FIGS. 2A and 2B. In various embodiments the glyph boxes shown in FIGS. 3A and 3B comprising bounding boxes, selection boxes, or hybrids of selection and bounding boxes as described above.

Figure 4:
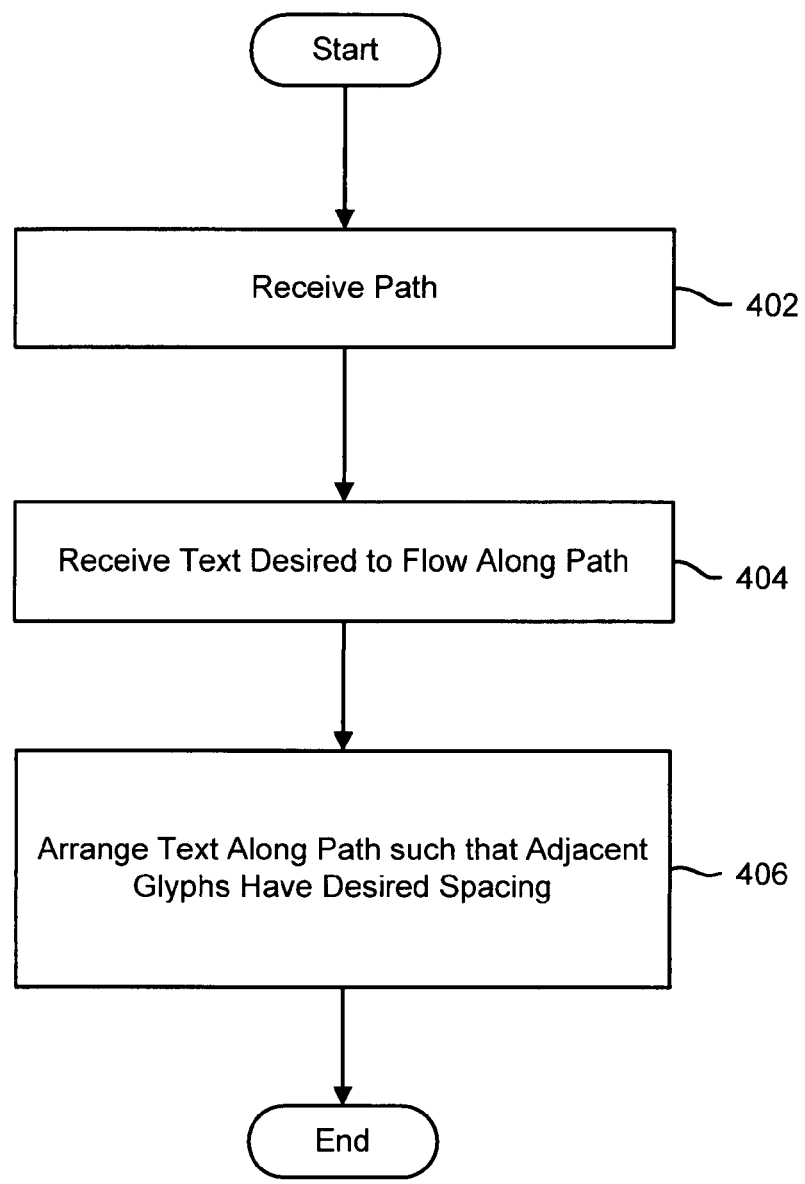
FIG. 4 is a flow chart illustrating an embodiment of a process for providing text flow along a non-linear path.

FIG. 4 is a flow chart illustrating an embodiment of a process for providing text flow along a non-linear path. In the example shown, the desired path is received at 402. Text desired to flow along the path received at 402 is received at 404. In 406, the text received at 404 is positioned along the path received at 402 such that adjacent glyphs have desired spacing. In various embodiments, 406 includes positioning the glyph box for each successive glyph along the path received at 402 such that the glyph box does not intersect, and/or has a prescribed (e.g., default character) spacing, from each other glyph box positioned along the path previously.

Figure 5:
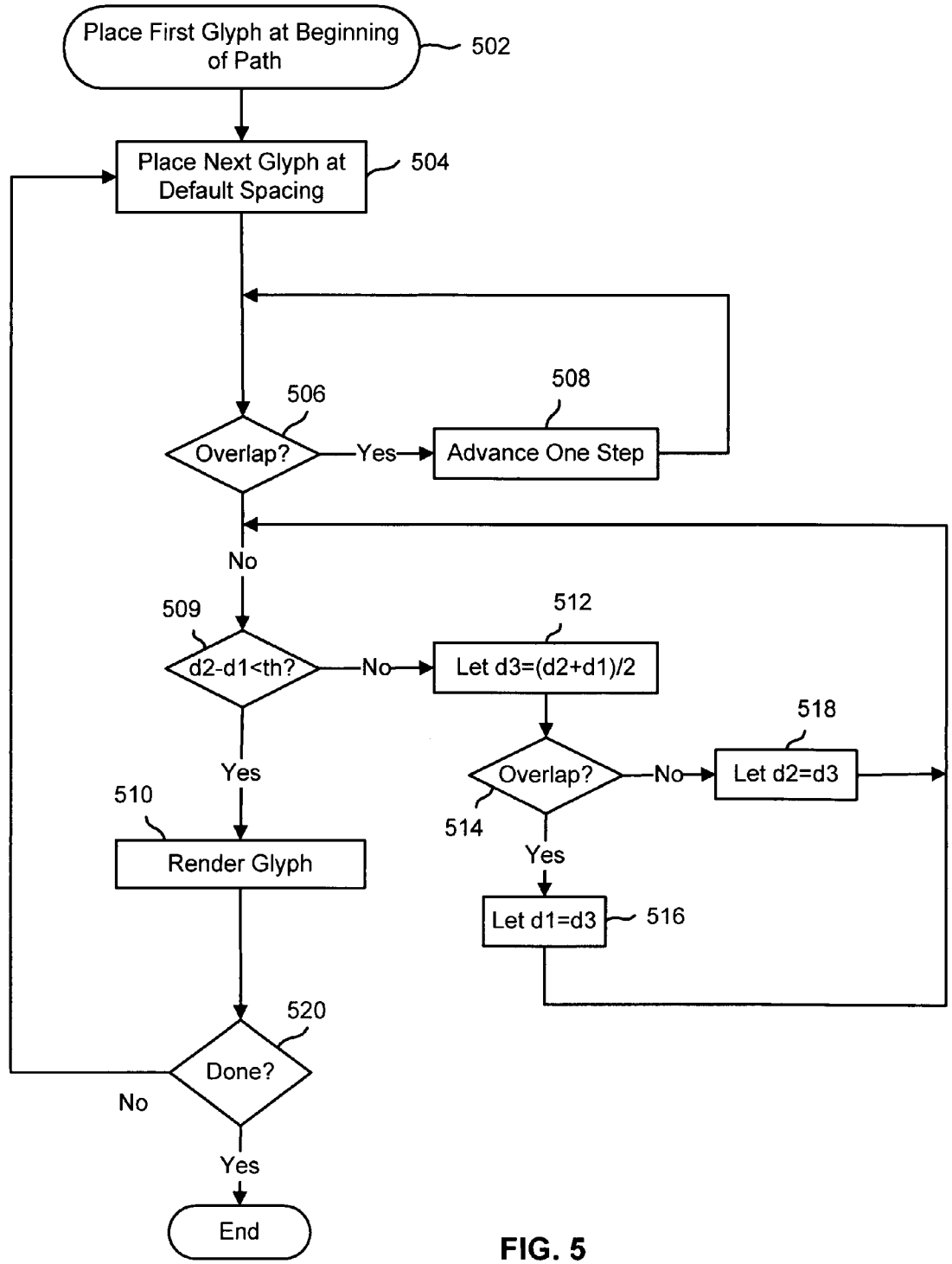
FIG. 5 is a flow chart illustrating an embodiment of a process for arranging text along a nonlinear path.

FIG. 5 is a flow chart illustrating an embodiment of a process for arranging text along a nonlinear path. In some embodiments, 406 of FIG. 4 includes the process of FIG. 5. At 502, a first glyph is placed at the beginning of the nonlinear path. In some embodiments, the first glyph is placed such that an anchor point of the glyph box is positioned at a leftmost or other (e.g., user indicated) starting point of the path. The first and subsequent glyphs are oriented in some embodiments such that for each glyph a glyph baseline associated with the glyph and its glyph box is tangent to the nonlinear path at a centerline point of the glyph baseline. In some embodiments, glyphs are oriented such that the baseline is a chord of the path, intersecting the path at the left and right sides of the glyph box, as described more fully below. In various embodiments, the baseline position for a glyph is the y-coordinate of the anchor point of the glyph. At 504, a next glyph comprising the text is positioned on the path initially at a default spacing "d" from the preceding glyph box. In some embodiments, the default spacing is zero and the left end of the glyph box for the glyph currently being positioned is placed initially at a point on the path at which the right end of the glyph box for the preceding glyph intersects the path. In some embodiments, the initial location is determined by a non-zero default spacing a point on the path at which the right end of the glyph box for the preceding glyph intersects the path. In some embodiments, the initial spacing is determined at least in part by the "advance" of the glyph preceding the glyph the initial position of which is being determined. In some embodiments in which a glyph is oriented such that its baseline is tangent to the path, the glyph is positioned along the path such that the point at which the glyph baseline intersects the glyph box is at a determined distance "d2" along the path. In some embodiments in which a glyph is oriented such that its baseline is tangent to the path, the glyph is positioned such that a point on the baseline of the glyph halfway across the glyph box is placed at a distance along the path equal to the distance d2 plus half the glyph box width. In an embodiment in which glyphs are placed as a chord, then the point of intersection between the baseline of the glyph and the left side of the glyph box is placed on the path at distance d2 along the path and the point of intersection between the baseline of the glyph and the right side of the glyph box is placed on the path at a distance along the path larger than d2 (so that the baseline intersects the path at both ends to form a chord). If there is more than one possible distance along the path larger than d2 at which the right side of the glyph baseline can intersect the path, then the smallest one is chosen. At 506, it is determined whether the glyph box of the glyph currently being positioned along the path overlaps (at the current spacing d2 from the preceding glyph) any previously-positioned glyph box. In some embodiments, well known algorithms for determining whether two polygons intersect are used. If the glyph box in the proposed position does overlap another glyph box, at 508 the glyph box for the glyph currently being positioned is advanced one step along the nonlinear path and a subsequent iteration of 506 is performed to determined whether the glyph box would overlap any other glyph box if the glyph were placed in the newly advanced position. In some embodiments, advancing the glyph box by one step in 508 comprises advancing the glyph box by the larger of (1) a small enough constant multiple of the minimum of the radius of curvature on the path segment in question: k1×(minimum radius of curvature) where k1 is a constant much less than 1, such as k1=0.1; and (2) a small enough constant multiple of the smaller of the glyph box heights of the character being placed and the previous character: k2×(min(current height, previous height)) where k2 is a constant much less than 1, such as k2=0.05. In some embodiments, k1 and k2 are chosen so as to be small enough to guard against the problem of stepping directly from one overlapping position to another overlapping position when there is a non-overlapping position lying between the two. In some embodiments, k1 and k2 are chosen to be large enough to minimize the number of steps needed to find a candidate non-overlapping position. In the example shown in FIG. 5, successive iterations of 506 and 508 are performed until a candidate position for the glyph box is found such that the glyph box does not overlap any other glyph box. Once a candidate position that would not result in the glyph box of the glyph currently being positioned overlapping any other glyph box is found, it is determined at 509 whether a current distance d2 associated with the current candidate position minus a previous distance d1 associated with a previous candidate position resulting from advancing one fewer steps (or the default advance, if no steps were taken) is smaller than a prescribed threshold. In some embodiments, the prescribed threshold comprises a prescribed multiple of the smaller of the previous and current character font sizes; i.e., d2−d1<k3×min(current font size, previous font size). If so, at 510 the glyph is rendered in the proposed position, i.e., at distance d2. In some embodiments, k3 is a constant much less than 1, such as k3=0.001. If not, at 512 the interval from d1 to d2 is bisected by letting d3=(d2+d1)/2, and it is determined at 514 whether the glyph if positioned at distance d3 would overlap. If so, at 516 d1 is assigned the value of d3. If not, at 518, d2 is assigned the value of d3. In either case (i.e., after 516 or 518, as applicable), the process returns to 509. Successive iterations of 512 to 518 are performed until a distance d2 such that d2−d1 is less than the threshold to which d2−d1 is compared at 509 is found at which the glyph is rendered at 510. Successive iterations of 504 to 510 are repeated until the last glyph has been positioned (520), after which the process of FIG. 5 ends. Note that the above interval bisection procedure to refine the non-overlapping glyph position (512-518) is much faster than the initial forward-stepping procedure (506-508), but the initial forward-stepping procedure is needed in some embodiments to get an approximate position because pure interval bisection would suffer from the above-mentioned problem of potentially bypassing a non-overlapping position lying between two overlapping positions. For certain path formulas, it is possible to derive in advance a formula for the parameter or the coordinates of the first non-overlapping glyph position. In that case, the formula is directly computed rather than applying the iterative single-stepping and bisecting procedures.

Figures 6A, 6B:
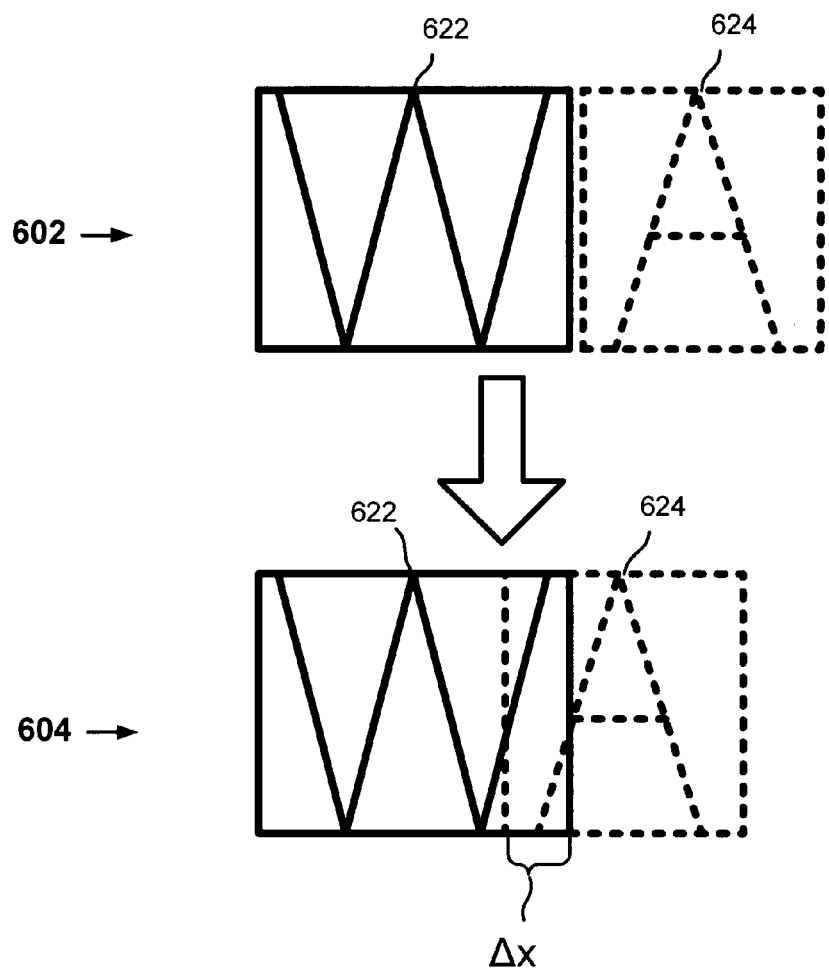
FIG. 6A shows an unkerned pair 602 and a kerned pair 604.
FIG. 6B shows the glyph boxes of the un-kerned pair 602 and the kerned pair 604 of FIG. 6A.

Kerning has long been used in linear text flow to enable certain glyphs having complementary shapes to be spaced more closely together than other glyph pairs. FIG. 6A illustrates kerning as applied to linear text flow. The capital letters "WA" are shown both without kerning (602) and with kerning (604). In the example with kerning, the rightmost (final) diagonal of the letter "W" follows a similar path as the leftmost (initial) diagonal of the letter "A", which makes it possible to space the pair of letters more closely together without undesirable inter-glyph interference. FIG. 6B shows the glyph boxes of the un-kerned pair 602 and the kerned pair 604 of FIG. 6A. As shown in FIG. 6B, kerning is achieved in some prior art approaches to linear text flow by defining for one or more kerning pairs, such as the pair W-A in this example, a kerning value "Δx" by which the glyph boxes of the respective glyphs comprising a kerning pair are allowed (or required) to overlap to achieve kerning. In this example, the glyph box 624 of the glyph "A" has in the kerned pair 604 been positioned so as to overlap the glyph box 622 of the glyph "W" by the kerning amount Δx associated with the pair W-A. Typically such kerning information is included and/or associated with the font information, such as the font definition file.

Figure 7:
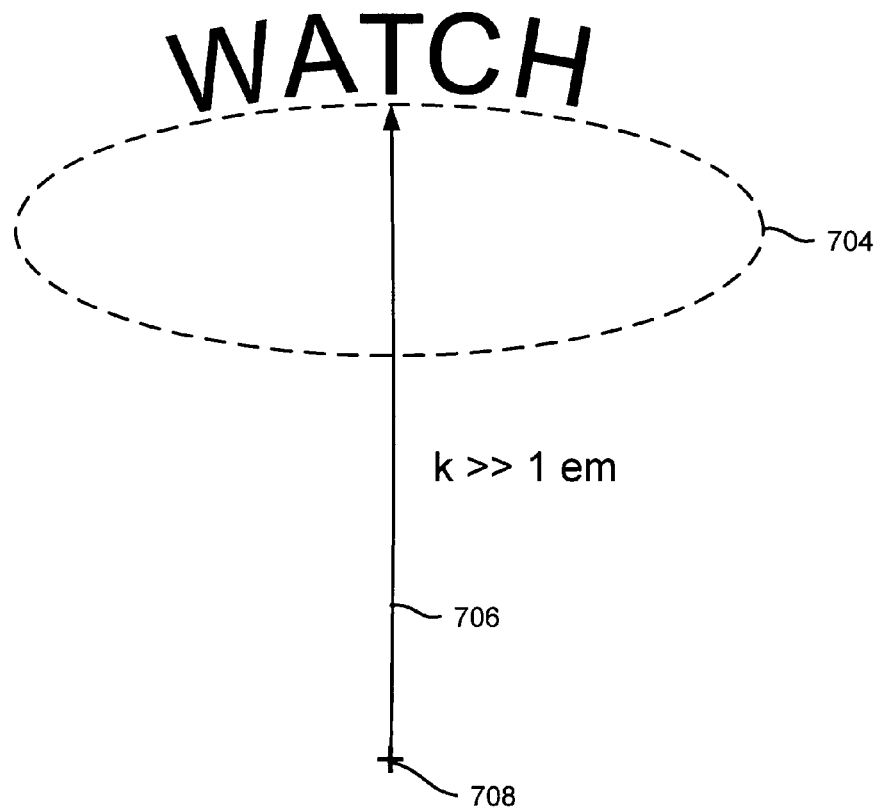
FIG. 7 shows an example of using kerning information to flow text along a portion of a nonlinear path for which the radius of curvature values k(t) are much greater than 1 em.

Using kerning information to position text along a nonlinear path is disclosed. In some embodiments, kerning information included in and/or associated with font definition data for a particular pair of glyphs (or in some cases glyphs selected from complementarily shaped groups of glyphs), if applicable, is taken into consideration in determining whether adjacent glyph boxes overlap or overlap by an unacceptable amount. The radius of curvature of a path can be different at each point along the path, so in general it is a function of the path parameter t. The radius of curvature at a point is the radius of the circular arc that most closely approximates the path near that point, in the sense that it has the same value, first derivative and second derivative of the path functions x(t) and y(t) as a function of distance parameter t, when evaluated at that point. (If the path is not already parameterized by distance then it is simple to derive an equivalent path parameterized by distance). It can be shown that the radius of curvature of a path is equal to the reciprocal of the magnitude of the second derivative of the position vector as a function of distance parameter t. In some embodiments, font kerning information developed (primarily) for linear text flow is used when all the radius of curvature values k(t) throughout the portion of a path along which text is laid out are significantly greater than an intrinsic measure of font size or scale. In some embodiments, the intrinsic measure of font size or scale is one "em", i.e., the declared point size of the font in question, which is historically the width of the capital letter 'M', in typefaces that include the letter 'M', or a roughly equivalent measure of width in typefaces that do not include a glyph for 'M' (e.g. those designed exclusively to represent Chinese, Arabic or symbolic characters). FIG. 7 shows an example of using kerning information to flow text along a portion of a nonlinear path for which the radius of curvature values k(t) are much greater than 1 em. In the example shown, the word WATCH in all capitals (702) is positioned along a nonlinear (in this case elliptical) path 704 having a radius of curvature values much large than 1 em, as illustrated by the radius of curvature (706) as measures from a center of curvature (708) for the point at which the glyph "T" is laid out. Using font kerning information in the example shown enables the glyphs "W" and "A" to be positioned nearer each other.

Figure 8A:
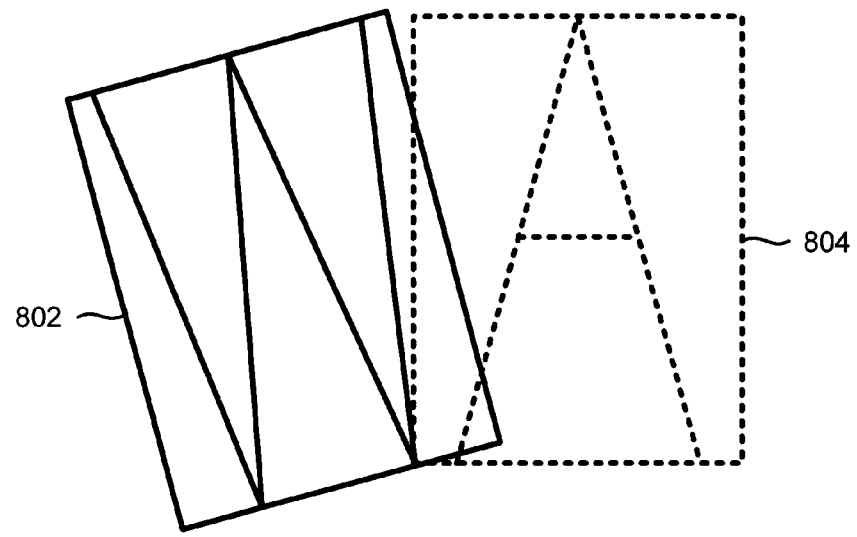
FIGS. 8A and 8B illustrate the use of kerning information to position glyphs along a nonlinear path.
Figure 8B:
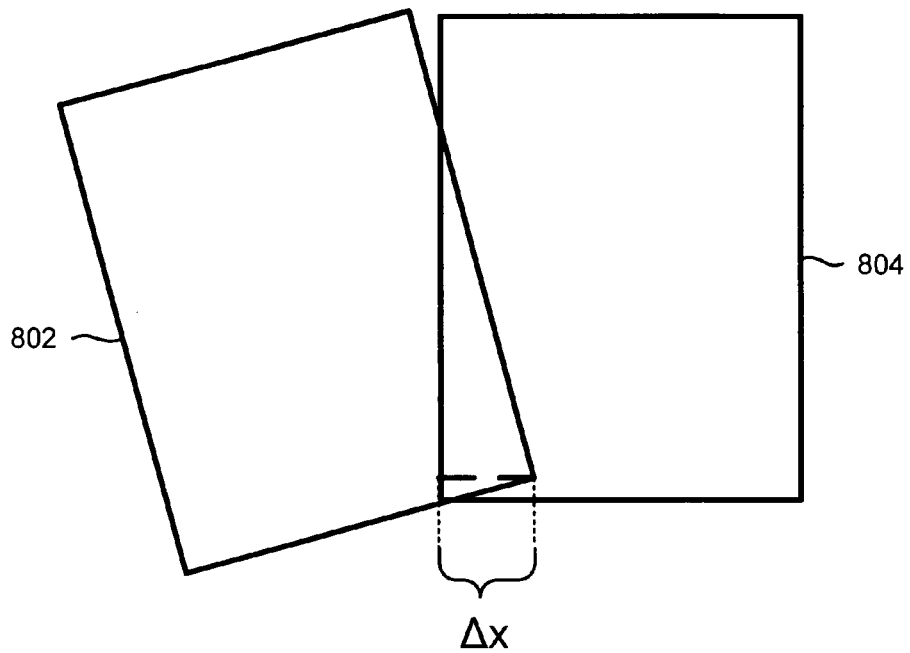

FIGS. 8A and 8B illustrate the use of kerning information to position glyphs along a nonlinear path. In the example shown, the glyph boxes 802 and 804 of the glyphs "W" and "A" respectively in the word "watch" shown in FIG. 7 are shown to have been positioned such that the glyph box 802 of the glyph "W" intrudes into the glyph box 804 of the glyph "A" by a maximum perpendicular distance equal to the kerning amount Δx associated with the pair W-A. Since the radius of curvature values k(t) are large relative to the font size, the angle between two successive glyphs is small and the kerning information developed for linear text flow yields a satisfactory inter-character spacing.

Figure 9:
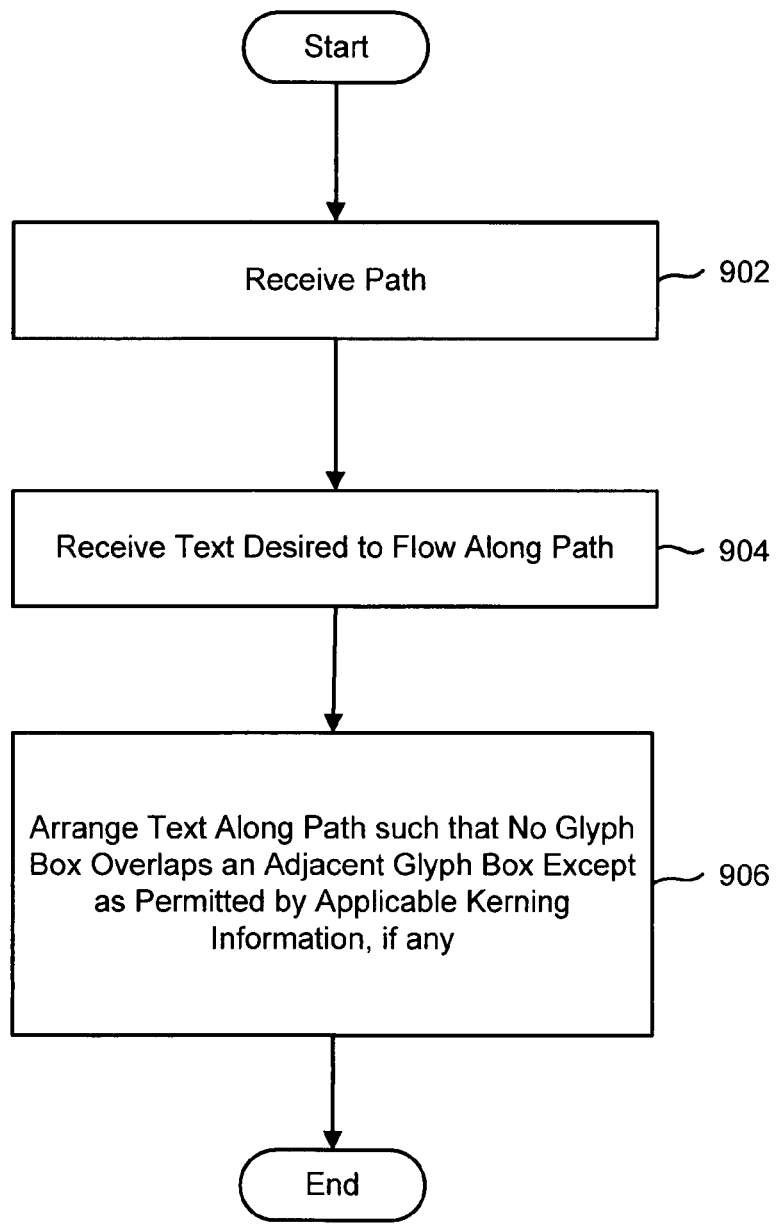
FIG. 9 is a flow chart illustrating an embodiment of a process for providing text flow with kerning along a non-linear path.

FIG. 9 is a flow chart illustrating an embodiment of a process for providing text flow with kerning along a non-linear path. A path and text desired to flow along the path are received (902 and 904). The glyphs comprising the text are arranged along the path such that no glyph box overlaps an adjacent glyph box except by an amount permitted by any applicable kerning information, if any (906).

Figure 10:
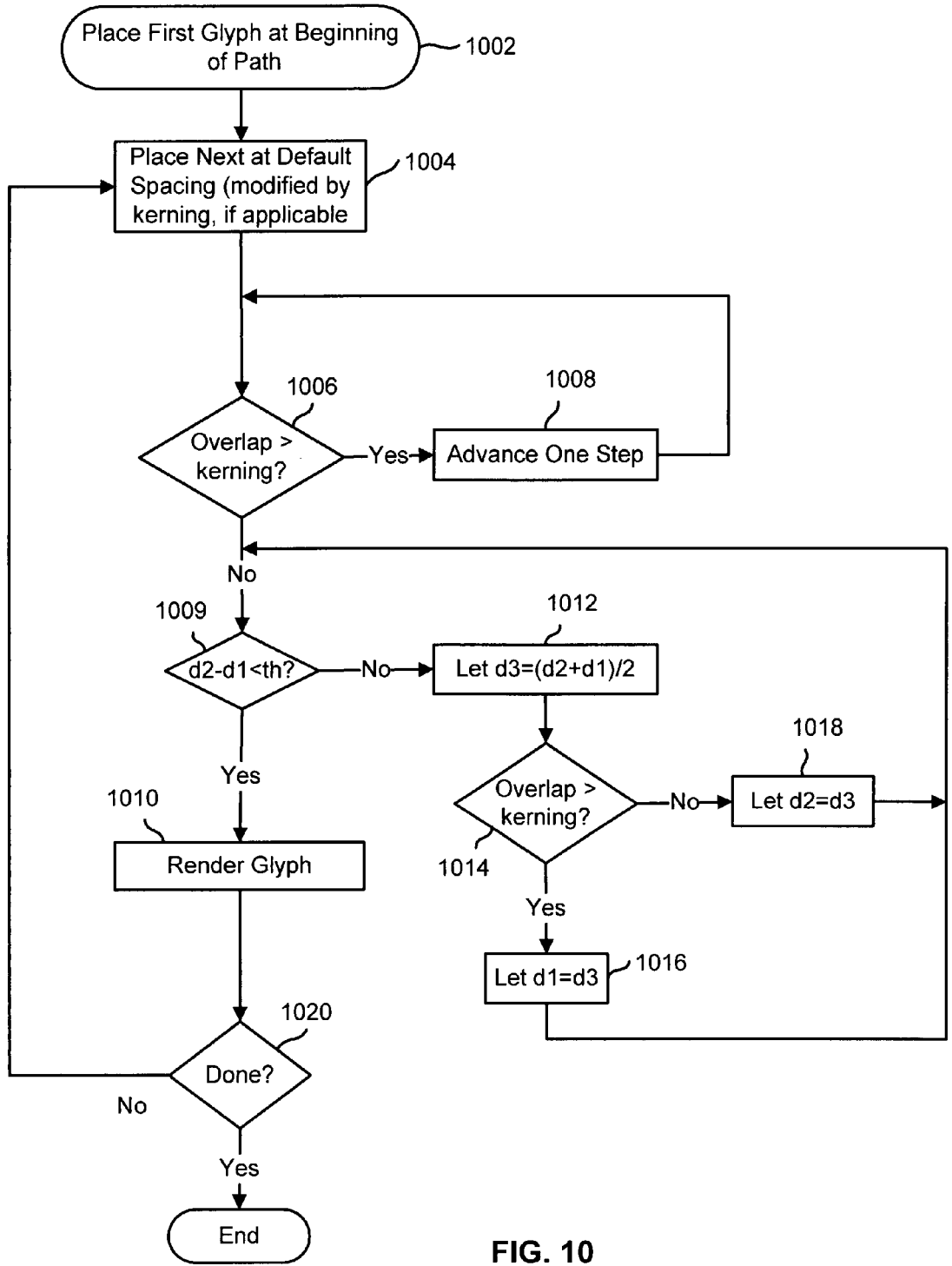
FIG. 10 is a flow chart illustrating an embodiment of a process for arranging text with kerning along a non-linear path.

FIG. 10 is a flow chart illustrating an embodiment of a process for arranging text with kerning along a non-linear path. In some embodiments, 906 of FIG. 9 includes the process of FIG. 10. The process of FIG. 10 is the same as the process of FIG. 5 except that kerning information is taken into consideration at 1004, in determining the initial position for a next glyph, and at 1006, in which it is determined, in the event the glyph box of a glyph currently being positioned overlaps the glyph box of another glyph, whether the overlap is greater than an amount permitted by applicable kerning information, if any. The remaining steps of FIG. 10 correspond to and in the example shown are the same as the corresponding (similarly numbered) steps of FIG. 5. In some embodiments, the process of FIG. 10 is applied to both reduced character spacing (kerning) and expanded character spacing, as applicable.

Figure 11A:
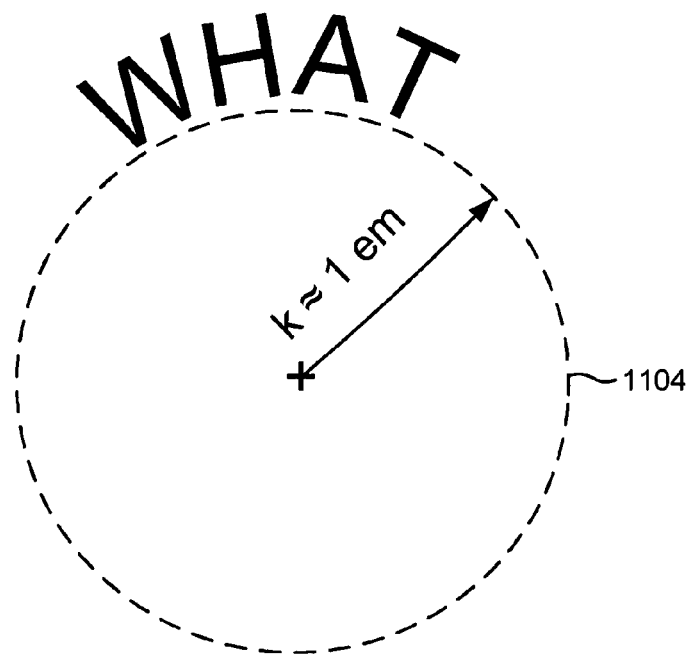
FIG. 11A shows an example of an additional kerning opportunity presented by text flow along a nonlinear path.
Figure 11B:
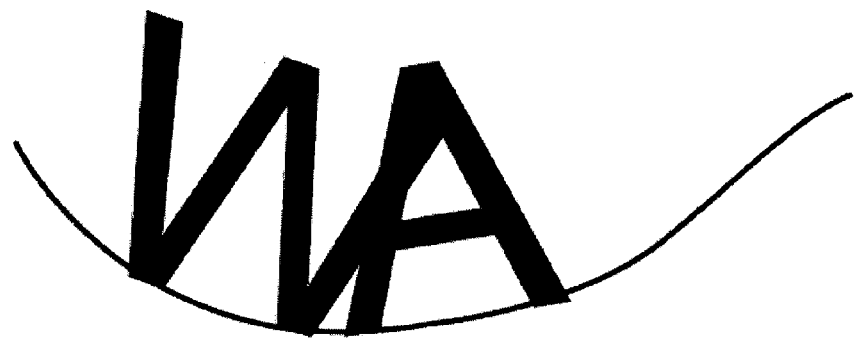
FIG. 11B shows an example of a collision between glyphs resulting from applying normal kerning to glyphs laid out on a path that is concave upwards with a sufficiently small radius of curvature.

Prior art approaches for providing text flow along a nonlinear path typically do not take advantage of additional kerning opportunities presented by the fact that adjacent glyphs may have complementary shapes that allow them to be positioned more closely together when positioned along a curved path than would be possible along a linear path. For at least some glyph pairs, such additional kerning opportunities are most significant when the radius of curvature is not much greater than the glyph size. FIG. 11A shows an example of an additional kerning opportunity presented by text flow along a nonlinear path. In the example shown, the glyphs "W" and "H" in the word "WHAT" (1102) are not kerned for linear text flow, because the left upright member of the glyph "H" parallels and runs the full height of the left upright boundary of its glyph box, leaving no room for an adjacent glyph to be moved nearer. However, when the same glyphs are positioned on a nonlinear path having a relatively small radius of curvature, such as the circular path 1104 of FIG. 11A, the glyphs "W" and "H" are oriented such that the rightmost diagonal member of the glyph "W" is parallel (or more nearly so than in the linear flow case) to the left upright member of the glyph "H", with the result that the two glyphs can be positioned nearer each other than in the case of linear text flow, without undesirable visual effect and/or inter-glyph interference. Similarly, prior art approaches for providing text flow along a nonlinear path may kern where inappropriate because shapes that were complementary when laid out in a linear fashion may no longer be complementary when laid out along a nonlinear path. For example, if 'WA' is laid out on a path that is concave upwards with a sufficiently small radius of curvature, then the normal kerning amount may lead to a collision between glyphs, as illustrated in FIG. 11B.

Figure 12A:
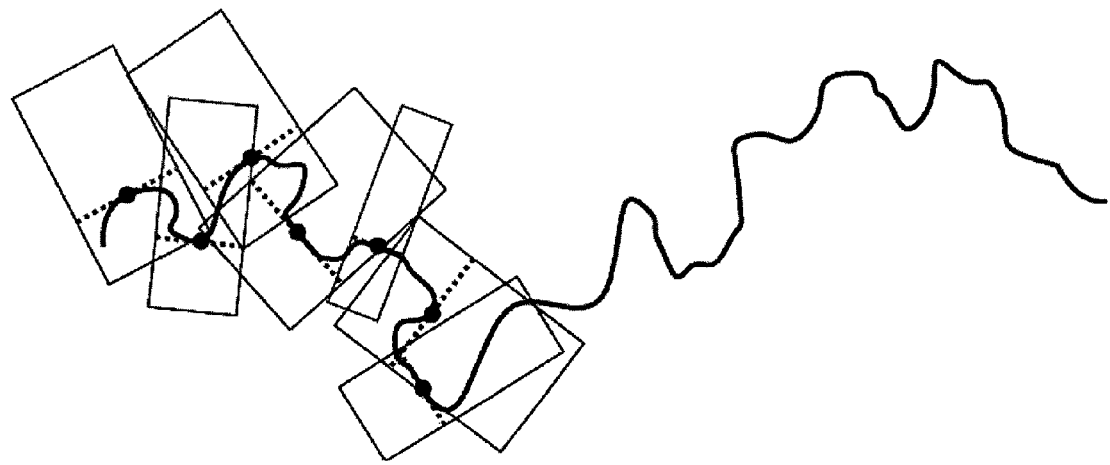
FIG. 12A shows a prior art approach to laying out glyphs along a nonlinear path, in which each glyph is laid out and oriented so that its baseline is tangent to the path and advance is measured along the path by an amount equal to width to the selection box.
Figure 12B:
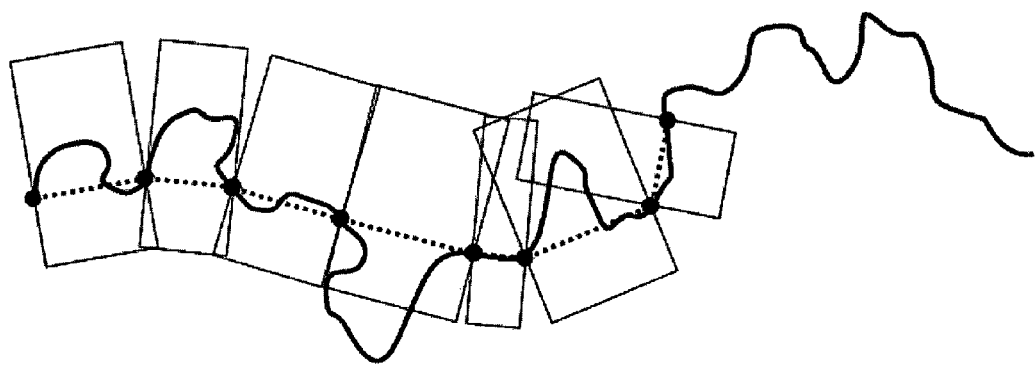
FIG. 12B shows improved results achieved in some embodiments by laying out and orienting glyphs such that for each glyph the baseline segment of the glyph box forms a chord on the path, with the endpoint of the previous chord being used as the start point for the next chord.
Figure 12C:
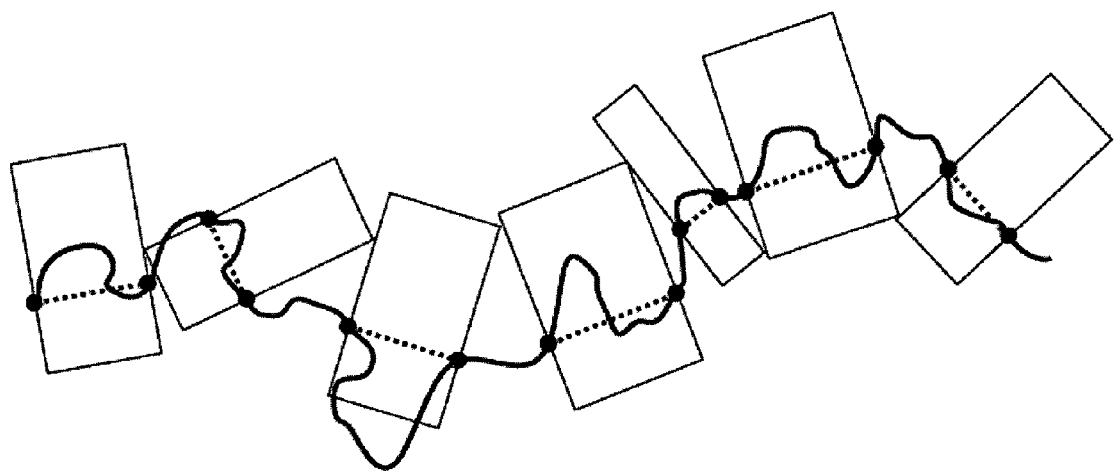
FIG. 12C shows improved results achieved in some embodiments by advancing each glyph box just far enough to avoid overlap.
Figure 12D:
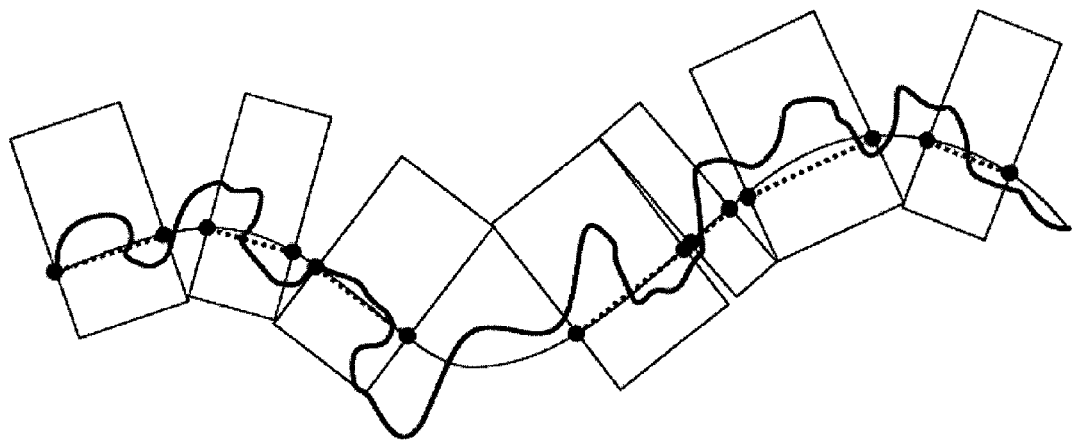
FIG. 12D shows improved results achieved in some embodiments by using a smooth curve generalization of a nonlinear path, and in this example laying out and orienting glyphs by having the glyph box baseline segment of each successive glyph form a chord on the smooth curve generalization of the path.

Of course, if the radius of curvature is too small relative to the glyph size, it may not be possible and/or desirable to arrange the text to flow along the precise received path because of readability problems, for example. Even if the glyphs are positioned such as to avoid each other, they may appear at very inconsistent angles and in such a way that the sequence of characters is not obvious, or it is not obvious where word breaks are supposed to occur. In some embodiments, if the minimum radius of curvature of a received path is smaller than a threshold multiple of an intrinsic measure of font size, such as a few "em", then a new path that approximates the original but has a larger minimum radius of curvature is used for purposes of laying out text. The below Appendix, under the heading Smooth Path Generalization in 2D, discloses formulas for constructing a new path meeting these requirements. In the field of Geographic Information Systems, there are known techniques for approximating a sampling of survey points along a path with fewer points for purposes of efficient map rendering at lower resolutions, and this process is called generalization. However, the problem addressed in the below Appendix is different in the sense that the input is a smooth path, not a sampling of data points, and the goal is not limited to achieving a visual approximation; it is also a goal to reduce minimum radius of curvature. Similarly, the statistical technique called kernel smoothing is aimed at finding a smooth approximation of discrete data points, and the computer graphics technique called convolution is aimed at averaging or otherwise combining discrete pixel values; neither addresses the problem of approximating a continuum of values such as a smooth path, and neither addresses the radius of curvature. Although the formulas in the below Appendix are written for 2-dimensional paths, this is for clarity. These formulas have an obvious generalization to a path in three or higher dimensions: Just as y can be substituted for x in the formulas, so can any coordinate in N-dimensional space. After optionally applying the smooth curve generalization formulas, glyphs are positioned along the resulting path as described above in connection with FIG. 5, for example, with the glyph box baseline segment either tangent to the path or a chord of the path. The chord technique (used either alone or in conjunction with smooth curve generalization) also mitigates the problem of small radii of curvature causing helter-skelter text flow. The reason is that glyph orientation only depends on the orientation of the chord, which joins points that are roughly 1 em apart. Path variations on smaller scales do not matter, except to the extent that they accumulate to create variations on the scale of approximately 1 em. FIGS. 12A-12D illustrate this effect. FIG. 12A shows a prior art approach, in which each glyph is laid out and oriented so that its baseline is tangent to the path and advance is measured along the path by an amount equal to width to the selection box. FIG. 12B shows improved results achieved in some embodiments by laying out and orienting glyphs such that for each glyph the baseline segment of the glyph box forms a chord on the path, with the endpoint of the previous chord being used as the start point for the next chord. In FIG. 12C, further improvement is achieved by advancing each glyph box just far enough to avoid overlap. Finally, FIG. 12D illustrates improvement achieved by using a smooth curve generalization of the path, and in this example laying out and orienting glyphs by having the glyph box baseline segment of each successive glyph form a chord on the smooth curve generalization of the path.

Figure 13A:
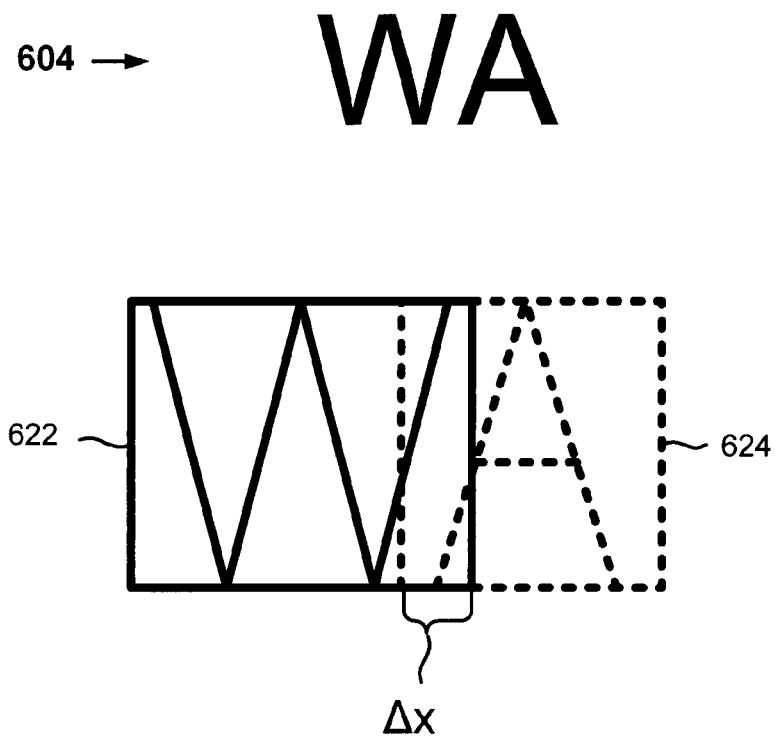
FIG. 13A shows the kerning pair W-A and associated glyph boxes overlapped to achieve kerning.
Figure 13B:
FIG. 13B provides an example of quadrilaterals defined to perform path-dependent kerning.

Defining for one or more glyphs a nonrectangular quadrilateral (such as a trapezoid in which the top and bottom sides are horizontal but one or both of the other two sides may not be vertical), to be used instead of and/or in connection with a glyph box for purposes of achieving path-dependent kerning of adjacent characters (or other glyphs) is disclosed. FIG. 13A shows by way of review the kerning pair W-A (604) and associated glyph boxes 622 and 624, overlapped to achieve kerning, as shown in FIGS. 6A and 6B. FIG. 13B provides an example of quadrilaterals defined to perform path-dependent kerning. In the example shown, a first quadrilateral 1302 has been defined for the glyph "W" and a second quadrilateral 1304 has been defined for the glyph "A". In some embodiments, kerning along any path, a linear path in the example shown in FIG. 13B, is achieved by placing the respective quadrilaterals 1302 and 1304 such that they are spaced apart at their nearest point by a default glyph spacing (which, in some embodiments, may be zero; i.e., the respective quadrilaterals touch without overlap). In some embodiments, for each of at least a subset of glyphs comprising a font a corresponding nonrectangular quadrilateral is derived from the glyph box and/or glyph outline included for that glyph in the font definition. The quadrilateral information is store with and/or in addition to the font definition, and is used to achieve path-dependent kerning when flowing text along a (e.g., non-linear) path.

Figure 14:
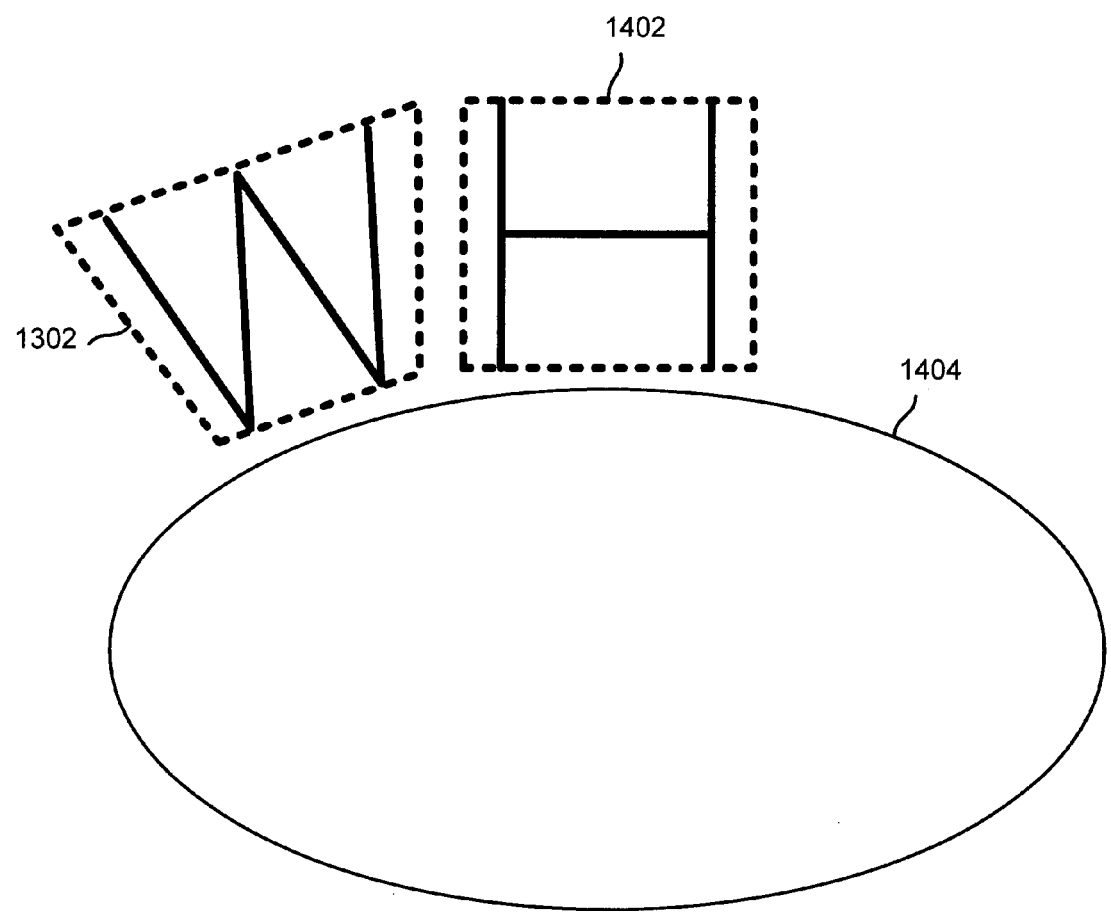
FIG. 14 illustrates use of a quadrilateral to achieve path-dependent kerning.
Figure 15:
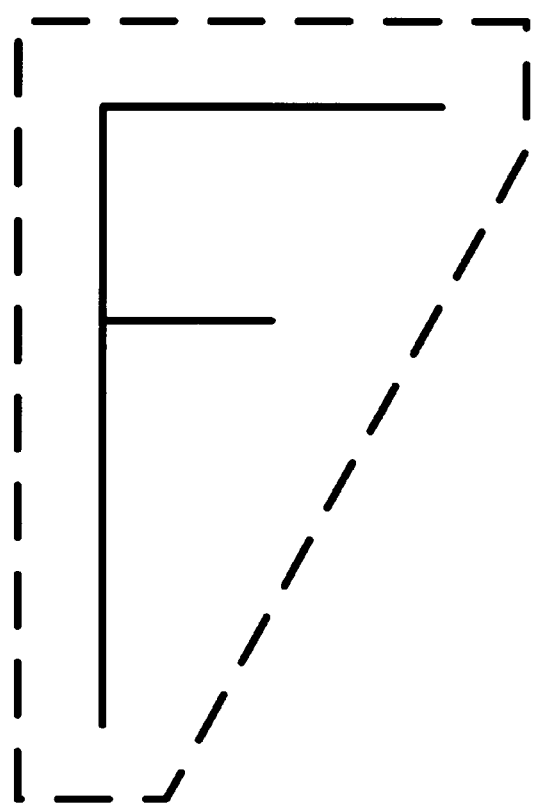
FIG. 15 shows an example of a five-sided bounding polygon used in some embodiments for the glyph "F".

FIG. 14 illustrates use of a quadrilateral to achieve path-dependent kerning. In the example shown, the glyphs "W" and "H", which are not typically considered a kerning pair for purposes of linear text flow, are shown to flow along a non-linear (in this case elliptical) path 1404. A glyph box 1402 associated with the glyph "H" is shown placed at a default glyph spacing from a bounding quadrilateral 1302 associated with the glyph "W", which results in the glyph "H" being placed nearer the glyph "W" than would have been the case had a rectangular glyph box been used for the glyph "W" and no overlap allowed (e.g., because W-H is not a traditional kerning pair). Note that the outer boundaries of the glyph "H" are essentially rectangular, such that in the example shown no nonrectangular bounding quadrilateral has been defined for the glyph "H". In some embodiments, for at least some glyphs a polygon having more or fewer than four sides is defined and used to achieve path-dependent kerning. For example, in some embodiments a five-sided bounding polygon is defined for the glyph "F", as shown in FIG. 15.

Appendix: Smooth Path Generalization in 2D

Objectives: Given a path C in the plane, find a second path $\tilde{C}$ that (i) approximates C; (ii) has the same start point and end point; and (iii) has a minimum radius of curvature that is at least as large, and can be made larger by any desired amount up to practical limits that may arise from conditions (i) and (ii).

Solution: Start with a path C expressed in a parameterized form as $$\left.\begin{aligned} x &= x(t) \\ y &= y(t) \end{aligned}\right\} 0 \leq t \leq L$$

where (x,y) are coordinates in the plane $R^2$ (where R represents the set of real numbers) parameter t is the distance from start point (x(0),y(0)) as measured along the path toward endpoint (x(L),y(L)), L is the total length of the path, which we assume to be finite, and x(t), y(t) are functions mapping [0,L] to R that are assumed to have piecewise continuous first derivative.

Extend x(t) and y(t) to all t E R as follows:
If x(L)=x(0) and y(L)=y(0) (a closed path) then set $$\left.\begin{aligned} x(NL+t) &= x(t) \\ y(NL+t) &= y(t) \end{aligned}\right\} \forall N \in Z, \forall t \in [0, L]$$

otherwise (an open path), set $$\left.\begin{aligned} x(2nL+t) &= x(t) \\ x((2n+1)L+t) &= x(L-t) \\ y(2nL+t) &= y(t) \\ y((2n+1)L+t) &= y(L-t) \end{aligned}\right\} \forall n \in Z, \forall t \in [0, L]$$

Next, define any "kernel" function $k:[0,\infty) \to [0, \infty)$ with the properties:
k is continuous
k is non-increasing
k has support less than or equal to L/2, by which we mean
$k(u)=0 \; \forall u > L/2$ $$\int_0^{L/2} k(u)du = \frac{1}{2}$$

For example, choose any positive real constant W≤L/2 and set $$k(u) = \begin{cases} \dfrac{1 - \dfrac{u}{w}}{w} & \text{for } 0 \leq u \leq w \\ 0 & \text{for } u \geq w \end{cases}$$

Note that the choice of kernel function will determine the exact manner in which the curve C is approximated and the degree to which the minimum curvature is increased.

Let $C_1$ be defined as the path with $x = x_1(t) = x(0) + \int_0^t \int_{-\infty}^{\infty} x'(\sigma) k(|\sigma-\tau|) d\sigma d\tau$ $y = y_1(t) = y(0) + \int_0^t \int_{-\infty}^{\infty} y'(\sigma) k(|\sigma-\tau|) d\sigma d\tau$ $C_1$ shares the same start point as C, and its tangent vector at t is $(x_1'(t), y_1'(t)) = \int_{-\infty}^{\infty} (x'(\sigma), y'(\sigma)) k(|\sigma - t|) d\sigma$ which is a weighted average of the tangent vectors at nearby parameter values σ on C (with weight decreasing to zero as σ moves further from t). By averaging tangent vectors, the rate of variation in path direction with t tends to be reduced, while the path remains close to the original. In particular, since the tangent vector is the first derivative of the position vector, it follows that the maximum magnitude of the second derivative tends to be reduced, and its reciprocal, which is the minimum radius of curvature, tends to be increased. Note that in the example kernel function of equation 1, W is a measure of the size of the neighborhood used in the weighted average, so larger values of W will tend to increase the minimum radius of curvature by more, and will tend toward curve approximations with smaller rate of variation in path direction.

Let $C_2$ be defined as the path with $x = x_2(t) = x(L) - \int_t^L \int_{-\infty}^{\infty} x'(\sigma) k(|\sigma-\tau|) d\sigma d\tau$ $y = y_2(t) = y(L) - \int_t^L \int_{-\infty}^{\infty} y'(\sigma) k(|\sigma-\tau|) d\sigma d\tau$ $C_2$ shares the same end point as C, and its tangent vector at t is $(x_2'(t), y_2'(t)) = \int_{-\infty}^{\infty} (x'(\sigma), y'(\sigma)) k(|\sigma - t|) d\sigma$ just as for $C_1$.

Thus $C_2$ is $C_1$ moved via a simple translation (if necessary) so that its endpoint coincides with that of C, rather than its start point. In the special case that C is a closed path, no translation is necessary, and $C_1 = C_2$.

In order to obtain a solution with the same start and end points as C, we use the following combination $\tilde{C}$ of $C_1$ and $C_2$:

$$x = \tilde{x}(t) = \left(1 - \frac{t}{L}\right) x_1(t) + \frac{t}{L} x_2(t)$$

$$y = \tilde{y}(t) = \left(1 - \frac{t}{L}\right) y_1(t) + \frac{t}{L} y_2(t)$$

The above equation is a weighted average of $C_1$ and $C_2$, where the weights increasingly favor $C_1$ as t→0 and they increasingly favor $C_2$ as t→L. Note that in the special case that C is a closed path, $\tilde{C}=C_1=C_2$. $\tilde{C}$ meets the stated objectives (i), (ii) and (iii) and therefore qualifies as a "smooth path generalization" of C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of rendering glyphs, comprising:
   receiving at a processor instructions to be executed by the processor associated with a set of glyphs to be flowed along a nonlinear path;
   using the processor to place a first glyph box associated with a first glyph of the set of glyphs at a corresponding location along the nonlinear path such that the first glyph box is spaced from a second glyph box associated with a second glyph of the set of glyphs, at a point nearest the second glyph box, by at least a prescribed distance; and
   determining whether the first glyph box is allowed to overlap with the second glyph box based at least in part on radius of curvatures occurring along a portion of the nonlinear path along which the first and second glyphs are placed and based at least in part on whether all radius of curvature values occurring along the portion exceed a point size of a font to which characters to be placed in the first and second glyph boxes belong.

2. A method as recited in claim 1, wherein the prescribed distance is zero.

3. A method as recited in claim 1, wherein the prescribed distance comprises a default glyph spacing.

4. A method as recited in claim 1, wherein placing a first glyph box associated with the first glyph at a first location along the path such that the first glyph box does not overlap a second glyph box associated with the second glyph comprises placing the first glyph box initially at a default spacing from the second glyph box and, in the event the first and second glyph boxes are determined to overlap at the default spacing, advancing the first glyph box along the path in successive steps until a non-overlapping position is found.

5. A method as recited in claim 4, further comprising determining whether the difference between a distance d2 associated with the non-overlapping position and a previous distance d1 resulting from advancing one fewer step than the number of steps advanced to reach the non-overlapping position is less than a prescribed threshold multiple of the smaller of a first font size of the first glyph and a second font size of the second glyph, and rendering the first glyph at the distance d2 from the second glyph if it is determined that the difference d2−d1 is less than the prescribed threshold multiple of the smaller of a first font size of the first glyph and a second font size of the second glyph.

6. A method as recited in claim 5, further comprising, in the event it is determined that the difference d2−d1 is not less than the prescribed threshold multiple of the smaller of a first font size of the first glyph and a second font size of the second glyph, iteratively bisecting the interval from d1 to d2 to determine a distance d3, and setting d1=d3 if the first and second glyphs overlap with the first glyph at distance d3 or setting d2=d3 if the first and second glyphs do not overlap with the first glyph at distance d3, until values for d2 and d1 are found such that the difference d2−d1 is less than the prescribed threshold multiple of the smaller of a first font size of the first glyph and a second font size of the second glyph.

7. A method as recited in claim 1, wherein in the event that the first glyph box is allowed to overlap with the second glyph box, placing the first glyph box associated with the first glyph at a first location along the path such that the first glyph box does not overlap the second glyph box associated with the second glyph except by an amount less than or equal to a kerning value, if any, associated with the first glyph and second glyph when paired together along a linear path.

8. A method as recited in claim 1, wherein determining whether the first glyph box is allowed to overlap with the second glyph box based at least in part on the radius of curvature of the portion of the nonlinear path along which the first and second glyphs are placed includes responsive to a determination that all radius of curvature values occurring along the portion exceed the point size, placing the first glyph box associated with the first glyph at a first location along the path such that the first glyph box does not overlap the second glyph box associated with the second glyph except by an amount less than or equal to a kerning value associated with the first glyph and second glyph when paired together along a linear path.

9. A method as recited in claim 1, further comprising smoothing at least a relevant portion of the path and using the smoothed curve or portion thereof to position the first and second glyphs along the path.

10. A method as recited in claim 9, wherein smoothing at least a relevant portion of the path is performed in response to a determination that the radius of curvature associated with at least a part of the at least a relevant portion is not substantially greater than 1 em.

11. A method as recited in claim 1, wherein the first glyph is oriented such that a baseline segment associated with the glyph forms a chord along the nonlinear path.

12. A method as recited in claim 1, wherein each of the first and second glyph boxes comprises a rectangle having a horizontal width determined by an advance value that defines a width of a selection box associated with the corresponding glyph, the advance value being included in a font data associated with the glyph and being greater than a width of a bounding box of the glyph, and a vertical height determined by a height of the bounding box of the glyph.

13. A method of rendering text, comprising:
   receiving at a processor instructions to be executed by the processor for each of one or more glyphs of a font a glyph box associated with the glyph;
   defining for at least one glyph of the font, without warping the glyph, a nonrectangular polygon that approximates an outline of the glyph in at least one respect more closely than the corresponding glyph box associated with that glyph, and that is to be used to perform kerning between the glyph and an adjacent glyph along a linear or nonlinear text flow path on which the glyph and the adjacent glyph are to be placed; and
   placing the glyph upon a section along the nonlinear path in a manner that allows the polygon to overlap another glyph box only in response to a determination that all radius of curvatures along the section exceed a point size of a font to which a character to be placed in the at least one glyph belongs.

14. A method as recited in claim 13, further comprising using the nonrectangular polygon to position the glyph along the nonlinear text flow path.

15. A method as recited in claim 14, wherein using the nonrectangular polygon to position the glyph along a nonlinear path includes positioning the nonrectangular polygon on the nonlinear path at a position such that the nonrectangular polygon does not overlap a polygon associated with an adjacent glyph.

16. A method as recited in claim 14, wherein using the nonrectangular polygon to position the glyph along a nonlinear path includes positioning the nonrectangular polygon on the nonlinear path at a position such that the nonrectangular polygon is spaced from a polygon associated with an adjacent glyph by at least a prescribed amount.

17. A system configured to render glyphs, comprising:
a processor; and
a memory coupled to the process and configured to provide to the processor instructions which when executed cause the processor to:
receive a set of glyphs to be flowed along a nonlinear path;
place a first glyph box associated with a first glyph of the set of glyphs at a corresponding location along the nonlinear path such that the first glyph box is spaced from a second glyph box associated with a second glyph of the set of glyphs, at a point nearest the second glyph box, by at least a prescribed distance; and
determine whether the first glyph box is allowed to overlap with the second glyph box based at least in part on radius of curvatures occurring along a portion of the nonlinear path along which the first and second glyphs are placed and based at least in part on whether all radius of curvature values occurring along the portion exceed a point size of a font to which characters to be placed in the first and second glyph boxes belong.

18. A system as recited in claim 17, wherein each of the first and second glyph boxes comprises a rectangle having a horizontal width determined by an advance value that defines a width of a selection box associated with the corresponding glyph, the advance value being included in a font data associated with the glyph and being greater than a width of a bounding box of the glyph, and a vertical height determined by a height of the bounding box of the glyph.

19. A computer program product for rendering text, the computer program product being embodied in a non-transitory computer readable storage medium and comprising computer instructions for:
receiving a set of glyphs to be flowed along a nonlinear path;
placing a first glyph box associated with a first glyph of the set of glyphs at a corresponding location along the nonlinear path such that the first glyph box is spaced from a second glyph box associated with a second glyph of the set of glyphs, at a point nearest the second glyph box, by at least a prescribed distance; and
determining whether the first glyph box is allowed to overlap with the second glyph box based at least in part on radius of curvatures occurring along a portion of the nonlinear path along which the first and second glyphs are placed and based at least in part on whether all radius of curvature values occurring along the portion exceed a point size of a font to which characters to be placed in the first and second glyph boxes belong.

20. A computer program product as recited in claim 19, wherein placing a first glyph box associated with the first glyph at a first location along the path such that the first glyph box does not overlap a second glyph box associated with the second glyph comprises placing the first glyph box initially at a default spacing from the second glyph box and, in the event the first and second glyph boxes are determined to overlap at the default spacing, advancing the first glyph box along the path in successive steps until a non-overlapping position is found.

21. A computer program product as recited in claim 19, wherein each of the first and second glyph boxes comprises a rectangle having a horizontal width determined by an advance value that defines a width of a selection box associated with the corresponding glyph, the advance value being included in a font data associated with the glyph and being greater than a width of a bounding box of the glyph, and a vertical height determined by a height of the bounding box of the glyph.

\* \* \* \* \*